United States Patent [19]

Brooks, Jr. et al.

[11] Patent Number: 5,659,449
[45] Date of Patent: Aug. 19, 1997

[54] DIRECT ACCESS STORAGE DEVICE WITH A MOLDED ACTUATOR MOTOR COIL SUPPORT

[75] Inventors: William Woodrow Brooks, Jr.; Jerome Thomas Coffey; Donald John Wanek, all of Rochester, Minn.

[73] Assignee: International Business Machines Corporation, Armonk, N.Y.

[21] Appl. No.: 769,292

[22] Filed: Dec. 18, 1996

Related U.S. Application Data

[63] Continuation of Ser. No. 566,492, Dec. 4, 1995, abandoned, which is a continuation of Ser. No. 315,794, Sep. 30, 1994, abandoned.

[51] Int. Cl.$^6$ .................. G11B 5/55; G11B 21/08
[52] U.S. Cl. .................. 360/106; 360/105; 310/27
[58] Field of Search .................. 360/104, 105, 360/106

[56] References Cited

U.S. PATENT DOCUMENTS

| | | | |
|---|---|---|---|
| 4,772,974 | 9/1988 | Moon et al. | 360/98 |
| 4,835,643 | 5/1989 | Schulze | 360/106 |
| 4,855,853 | 8/1989 | Matsushita et al. | 360/106 |
| 4,985,652 | 1/1991 | Oudet et al. | 310/15 |
| 5,122,703 | 6/1992 | Takahashi et al. | 310/36 |
| 5,148,071 | 9/1992 | Takahashi | 310/208 |
| 5,168,185 | 12/1992 | Umehara et al. | 310/15 |
| 5,208,712 | 5/1993 | Hatch et al. | 360/98.01 |
| 5,305,169 | 4/1994 | Anderson et al. | 360/105 |
| 5,305,170 | 4/1994 | Dion | 360/105 |

FOREIGN PATENT DOCUMENTS

| | | | |
|---|---|---|---|
| 0582463 | 2/1994 | European Pat. Off. | |
| 56632 | 1/1993 | Japan . | |
| 5274822 | 10/1993 | Japan | 360/106 |
| 6-76516 | 3/1994 | Japan | 360/104 |
| 9201283 | 1/1992 | WIPO | 360/106 |

*Primary Examiner*—Stuart S. Levy
*Assistant Examiner*—William J. Klimowicz
*Attorney, Agent, or Firm*—Laurence R. Letson; Charles C. Cary; Francis A. Sirr

[57] ABSTRACT

An actuator for a PCMCIA DASD incorporates a tie bridge for stabilizing the support arms of the actuator while at the same time not increasing the largest radial dimension of the actuator drive motor beyond that of the radial dimension for the exterior of the coil. The tie bridge is disposed above, below, or both above and below the coil of the actuator drive motor. This space otherwise unused is now advantageously utilized, while additionally creating benefits in the design and the operation of the DASD. A crash stop and latch surface are incorporated into the structure of one of the support arms supporting the coil in such a way that the forces encountered by the actuator upon forcible engagement with a rigid structure within the DASD housing are absorbed and thereby reduced to values less than critical failure values.

1 Claim, 3 Drawing Sheets

DIRECT ACCESS STORAGE DEVICE WITH A MOLDED ACTUATOR MOTOR COIL SUPPORT

This application is a continuation of application Ser. No. 08/566,492, filed Dec. 4, 1995, now abandoned, which was a continuation of application Ser. No. 08/315,794, filed Sep. 30, 1994, now abandoned.

BACKGROUND OF THE INVENTION

1. Field of the Invention

This invention relates to Direct Access Storage Devices (DASD) and more specifically to the actuator of such a Direct Access Storage Device.

2. Description of Related Art

With the design of smaller Direct Access Storage Devices (DASDs) and implementation of industry standards, such as the Personal Computer Memory Card International Association (PCMCIA) standard, DASDs have become so small that available interior space is at a high premium. The size of the DASD and the corresponding sizes of the actuator contained within the DASD reduce the inherent structural strength of the components to the point that it is most difficult to manufacture the components and to maintain the necessary structural integrity. The difficulty arises with the requirement that the internal components both must have sufficient strength for operation and reliability, and be sufficiently small to fit within the size constraints imposed by the PCMCIA standard.

The material of the actuator coil holder, which extends between the support arms of the coil holder of the prior art actuators, could be removed to conserve space. However, the cantilever beam and the cantilever beam strength of the coil support arms then may not be sufficient to sustain drive forces and to preserve integrity while maintaining the bobbin shape and location relative to the actuator. This is particularly the case whenever the material selected for the coil holder is injection molded plastic.

The strength and integrity of the support arms are critical to the extremely-fine positioning of the actuator, and its associated load beam and slider with respect to the rotating recordable disks within the DASD.

In the coil support assembly of the prior art devices, the spanning member, which spans the gap between the support arms of the coil support assembly, provides stability to the support arms. This spanning member may not be eliminated if the overall size of the actuator coil holder is so reduced in size as to effect strength of the actuator assembly. The size of the coil is at least, in part, dictated by the drive forces required of the actuator motor.

The removal of the portion of the coil support assembly spanning the support arms of the coil support assembly to meet the criteria necessary for inclusion in the PCMCIA DASD design jeopardizes the reliability of the operation of the actuator. The drive forces, as exerted on portions of the coil, may cause flexure of the support arms of the coil assembly, thus destroying, or at least severely degrading, the position of the coil relative to the magnets of the actuator drive motor.

Degradation of the position of the magnetic coil relative to the magnet will commensurately degrade the position of the load beam and slider relative to the recordable disk surface. Thus, the disk drive will fail to yield the necessary recording density in terms of Tracks Per Inch (TPI).

If the size of the actuator coil holder is reduced to conform with the reduced dimensional requirements of the PCMCIA DASDs, the coil support assembly portion, which spans the support arms in the prior art actuator devices, occupies space which must be eliminated. On the other hand, the largest possible actuator coil size must be maintained to provide the necessary selection forces.

The actuator typically may be latched in an inactive position to prevent damage to the slider or the disk of the DASD whenever the actuator is not in use, or whenever the disk drive (DASD) is removed from the piece of equipment in which it may be installed for use.

SUMMARY OF THE INVENTION

It is an object of the invention to stabilize the coil support arms of a miniaturized actuator assembly while not consuming any area radially outward from the coil of the actuator motor.

It is another object of the invention to stabilize members of an actuator motor by utilizing space within the DASD housing not otherwise used to contain other elements.

It is a further object of the invention to make the required footprint for the actuator as compact as possible.

Other objects of the invention will become apparent to one of skill in the art with a complete understanding of this invention.

The objects of the invention are accomplished and the shortcomings of the prior art are overcome by the present invention as summarized in the summary of the invention below.

An actuator for a PCMCIA DASD incorporates a tie bridge for stabilizing the support arms of the actuator while at the same time not increasing the largest radial dimension of the actuator drive motor beyond that of the radial dimension for the exterior of the coil. The tie bridge is disposed above, below, or both above and below the coil of the actuator drive motor. This space otherwise unused is now advantageously utilized, while additionally creating benefits in the design and the operation of the DASD. A crash stop and latch surface are incorporated into the structure of one of the support arms supporting the coil in such a way that the forces encountered by the actuator upon forcible engagement with a rigid structure within the DASD housing are absorbed and thereby reduced to values less than critical failure values. A more complete appreciation of the invention and its attendant advantages may be had from the following detailed description when considered in connection with the accompanying drawings.

DESCRIPTION OF THE PREFERRED EMBODIMENT

Figure 1:
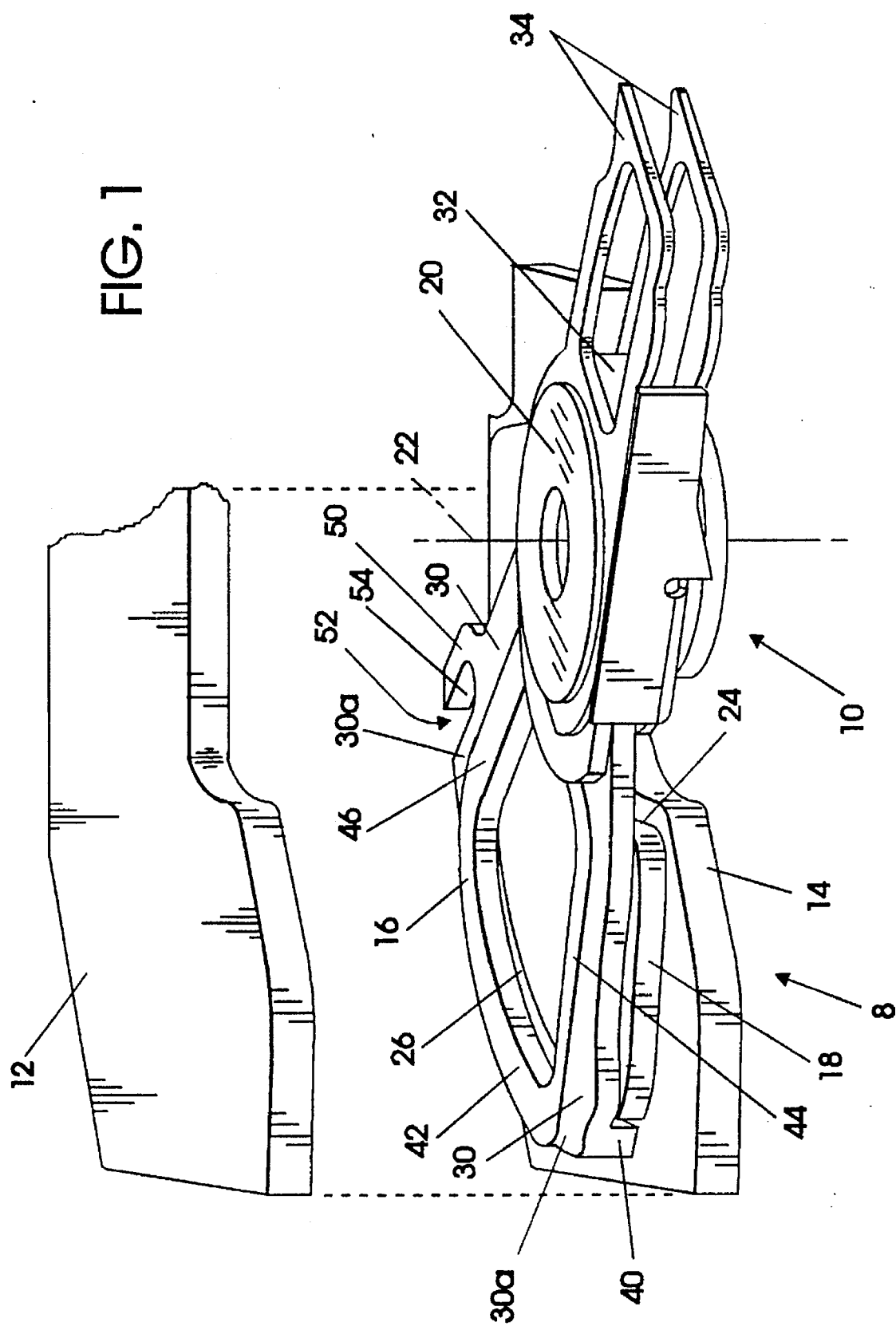
FIG. 1 is a partially exploded elevated perspective view of a portion of an actuator of a PCMCIA DSAD.

Referring initially to FIG. 1, an actuator motor 8 is illustrated with a flat pole piece 12 partially exploded away from the actuator 10. A similar pole piece 14 is disposed beneath the portion of actuator 10 which incorporates coil 16, and which in cooperation with magnet 18 and pole pieces 12, 14, function to drive actuator 10 about bearing 20 and pivot axis 22.

Figure 3:
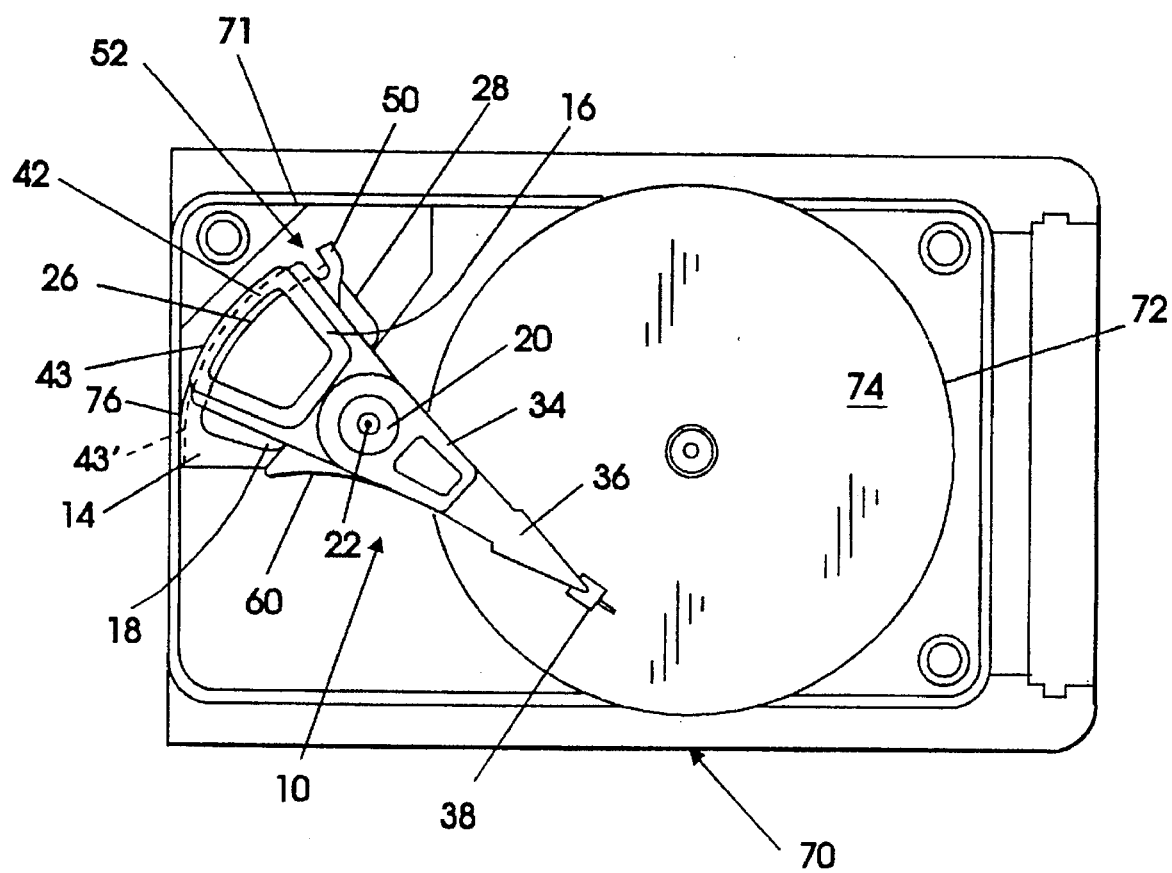
FIG. 3 is a top view of an uncovered DASD with the actuator of the present invention incorporated therein.

Magnet 18 is dimensioned and shaped with an arcuate inner edge surface 24 and an arcuate outer edge surface 26; the substantially straight side edge surfaces 28 of both sides of plate magnet 18 may be more clearly observed in FIG. 3.

Coil 16 is placed between, and in very close proximity to, magnet 18 and pole piece 12. Supporting coil 16 are support arms 30, extending generally from the hub structure 32, which is in turn supported by bearing 20.

Support arms 30 and hub 32 are preferably formed by injection molding of a fiber reinforced plastic. The fibers used for reinforcement are preferably carbon fibers which serve the dual purpose and function (1) to strengthen the plastic molding (a significant need in view of the size of the actuator 10 device), and (2) to provide electrical conductivity from the various surfaces of the actuator 10 in order to discharge static electricity to electrical ground, not shown.

In order to assure the reliable and consistent positioning of coil 16 relative to the rest of the actuator 10 (a condition necessary for precision location of the arms 34, load beam 36 and slider 38 (FIG. 3)), the support arms 30 need reinforcement. In order to improve the structural integrity and strength of the actuator 10, and particularly the portion of the actuator 10 forming the coil support arms 30, a tie bridge 40 is disposed below coil 16, and particularly segment 42 of coil 16, extending between and joining support arms 30 at their distal ends 30a.

Tie bridge 40 serves multiple functions. The primary function of tie bridge 40 is to establish and maintain the spread between support arms 30, and to prevent the support arms 30 from being displaced relative to each other, either increasing or decreasing the support arms 30 spread. Some prior art devices have a web of material in the same plane as the coil, and spanning between the arms of the actuator assemblies, but this web of material enlarges the size of the actuator motor and consumes space, which may not be available in the smaller PCMCIA DASDs.

In addition to providing stability to the relative locations of support arms 30, the tie bridge 40 further is integrally formed with the distal ends 30a of support arms 30, and is disposed closely adjacent the outer radial edge surface 26 of magnet 18. The space occupied by tie bridge 40 is not otherwise occupied by components or elements of the DASD 70 of FIG. 3 because the magnet 18 need not extend underneath the portion 42 of coil 16 for the actuator motor 8 to properly operate. Only segments 44 and 46 of coil 16 provide driving forces which are useful in pivoting actuator 10 about axis 22.

In the event that two magnets, such as magnet 18, are used, one above (not shown) and one below the coil 16, there will be space located radially outward from edge surface 26, and the similar edge surface of a second magnet (not shown) to permit the incorporation of two tie bridges 40, one above and one below segment 42 of coil 16.

The second function that tie bridge 40 performs is to improve the rigidity of segment 42 of coil 16, and prevent sagging thereof. Sagging of the coil 16 segment 42 by only a small amount may cause bridging of the actuator 10 when actuator 10 is driven about axis 22. The fusing of the tie bridge 40 and segment 42 of coil 16 forms a composite beam structure of a relatively high strength, and resists deformation of the coil 16 segment 42.

Thirdly, the tie bridge 40 and segment 42 of coil 16 form a beam structure acting as a shock and force transmission member to transmit forces from one support arm 30 to the other support arm 30 when crash stop 50 encounters either a portion of the disk drive housing 71 of FIG. 3, or a rigid stop member, not shown. Crash stop 50 prevents any improper electrical signal transmitted to coil 16 from driving the actuator 10 to the point where either the slider 38 and load beam 36 or support arms 30 and coil 16 might be impacted into a rigid portion of the DASD assembly 70. Crash stop 50 thereby protects the actuator 10, and particularly the actuator motor 8 from any accidental damage.

In addition, the forked formation of crash stop 50, extending from the coil support arm 30, permits the appendage-forming crash stop 50 to flex on impact, and thus absorb at least some of the impact forces. The interior channel 52, formed between crash stop 50 and support arm 30, further forms a latch surface 54 on crash stop 50 which may be used by a latch (not shown) to lock the actuator 10 into a position. When locked, actuator 10 will not move if the disk drive 70 is not being used, or has been removed from the computer within which the DASD 70 is installed for use.

Figure 2:
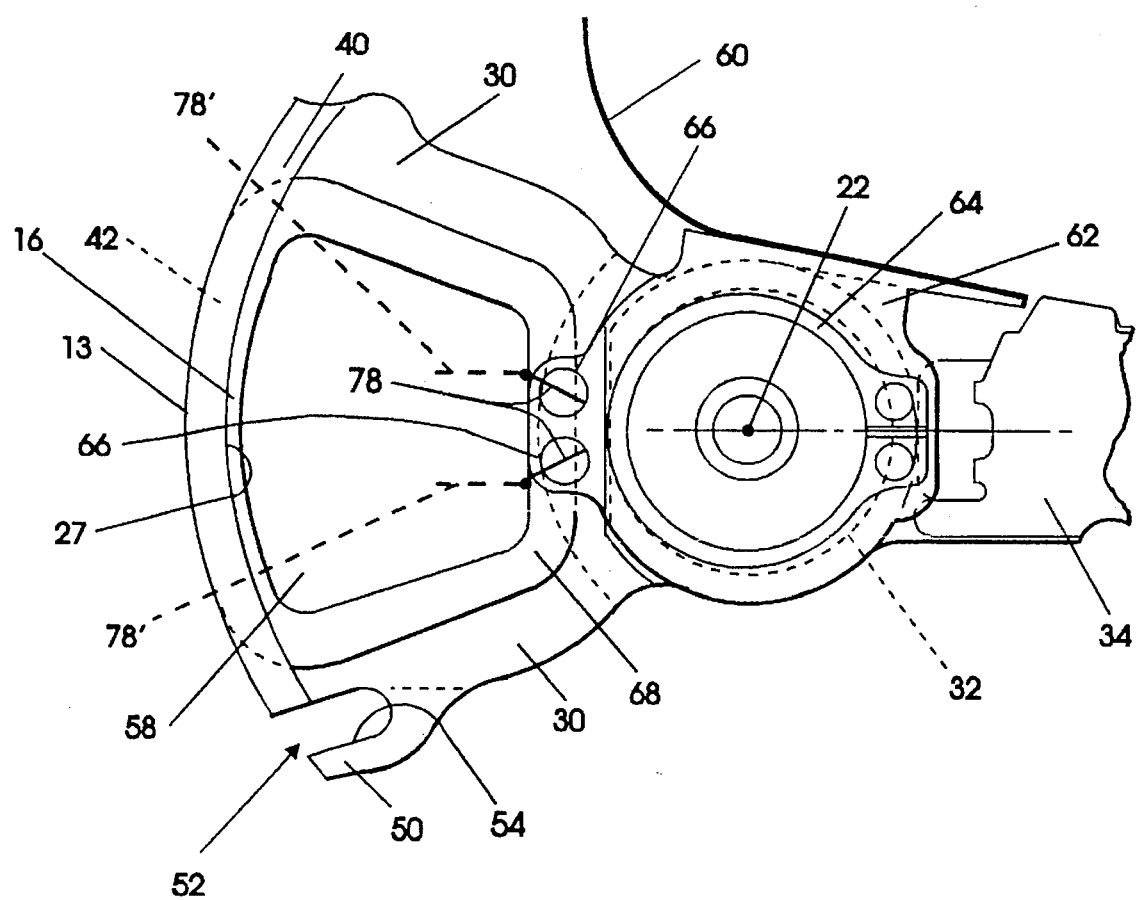
FIG. 2 is a bottom view of the coil support portion of the actuator illustrated in FIG. 1.

With reference to FIG. 2, the location of tie bridge 40 is more apparent. It can be readily seen that the tie bridge 40 and segment 42 of coil 16 form a composite beam structure.

Further, a flex cable 60, as illustrated in FIG. 2, is connected to a portion of flex circuit 62 which resides about hub 32. Flex circuit 62 is retained in position by spring clamp 64 so that contact pads 66 are disposed on the underside 68 of coil 16, and exposed so that two leads 78 of coil 16 may be connected to the flex circuit 62. These leads 78 may be formed to be disposed very close to, or in contact with, contact pads 66 for soldering. The positions of leads 78 during the molding operation are illustrated at 78' extending into the central opening 58 within coil 16. Thus, the leads 78 are not damaged, or deformed, whenever the mold closes on coil 16, and coil 16 acts as a seal between the compressing surfaces of a mold to prevent the plastic material from migrating from the region of support arms 30 into the central opening 58.

As can be more clearly observed in FIG. 2, while performing the stabilization and support functions described earlier, tie bridge 40 does not increase the radial distance from axis 22 to the outer arcuate surface 13 of coil 16. The interior arcuate surface 27 of tie bridge 40, when assembled with the remainder of the actuator motor magnet 18 as in FIG. 1, is closely spaced from the outer surface 26 of magnet 18.

Referring now to FIG. 3, the actuator 10, illustrated in FIGS. 1 and 2, is incorporated within a DASD 70, which incorporates a disk 72 having a magnetically or optically recordable surface 74 thereon. As can be observed at the left portion of DASD 70, the gap 76 between the exterior wall of the DASD 70 and the exterior surface 43 of segment 42 of coil 16, as indicated by dashed line 43', is extremely small and will not permit the addition of any material outside the exterior surface 43 and still permit the driving of the actuator 10 through its various positions relative to DASD 70 and disk 72.

As can be seen from the drawings and the foregoing description, this actuator 10 makes much more efficient use of the available space with a footprint of reduced size relative to other actuators which completely encircle coils, such as coil 16, with material to provide the stability and support that tie bridge 40 provides to coil 16, and particularly to segment 42 thereof. An additional benefit of the actuator 10 structure, as described herein, is that any material used in tie bridge 40 is disposed closer to axis 22 than any material which might otherwise completely encircle coil 16 and be disposed on the outer surface 43 of segment 42 of coil 16, thus reducing the inertia of the device. The inertia of the actuator 10 must be overcome by the actuator motor 8 of actuator 10 anytime that the slider 38 is moved from one position to another position on surface 74 of disk 72. With reduced inertia, the size of the actuator motor 8 may be still further reduced in size.

Additionally, the incorporation of the latch surface 54 into crash stop 50 reduces the need for additional material for any separate functional portions of the actuator 10 in order to accommodate both crash stop shock absorption, and to latch the actuator 10 in a position which will prevent damage to surface 74 of disk 72.

One of skill in the art upon understanding and appreciating the advantages of this invention will further understand that minor modifications and repositioning of some elements of the actuator may be accomplished without affecting its overall operation, and without removing the modified actuator mechanism from the scope of the claims attached hereto.

What is claimed is:

1. A disk drive (70) for storing and retrieving data relative to the planar surface (74) of a magnetic disk (72), comprising:

a magnetic disk mounted for rotation about a first axis that extends normal to said planar surface of said disk;

a carbon fiber reinforced plastic hub (32);

a bearing (20) mounting said hub for rotation about a second axis (22) that is parallel to and spaced from said first axis;

an arm assembly (34,36) extending from a first side of said hub normal to said second axis;

a slider (38) supported by said arm assembly so as to cooperate with said planar surface of said disk;

a magnetically permeable and planar pole piece (12) disposed at a fixed position adjacent to an opposite side of said hub;

said pole piece occupying a third plane that is parallel to said planar surface of said disk;

a planar magnet (18) disposed at a fixed position adjacent to said opposite side of said hub;

said magnet occupying a fourth plane that is parallel to and spaced from said third plane;

said spacing of said pole piece and said magnet defining a magnetic gap having a thickness measured parallel to said second axis;

an outer arcuate surface (26) formed on said magnet;

said arcuate outer surface of said magnet being formed as a first radius about said second axis;

a pair of arcuately spaced, elongated, and equal length carbon fiber reinforced plastic coil support arms (30) formed integrally with said hub and radially extending from said opposite side of said hub;

each of said coil support arms having a distal end (30*a*) that extends beyond said arcuate outer surface of said magnet;

a carbon reinforced plastic tie bridge (40) integrally formed with and extending between said distal ends of said coil support arms;

said tie bridge having a top portion, and having a bottom portion that is located in said fourth plane;

said bottom portion of said tie bridge having an arcuate inner surface (27) that is radially spaced from said arcuate outer surface of said magnet and is formed as a second radius about said second axis;

said second radius being greater than said first radius;

a planar, open center, wire coil (16) having a first coil leg (46) integrally formed with one of said coil support arms, having a second coil leg (44) integrally formed with the other of said coil support arms, having a third coil leg (42) integrally formed with said top portion of said tie bridge, and having a fourth coil leg integrally formed with said hub;

said coil support arms and said first and second coil legs being arcuately movable within said magnetic gap and about said second axis;

said coil support arms and said first and second coil legs having a thickness measured parallel to said second axis that is less than said thickness of said magnetic gap;

said tie bridge and said third coil leg being located outside of said magnetic gap and having a thickness measured parallel said second axis that is greater than said thickness of said magnetic gap;

a flexible circuit board (62) disposed on said hub;

two electrical leads (78) extending from said fourth coil leg and connected to said flexible circuit board;

a flexible cable (60) connected to said flexible circuit board;

a flexible, U-shaped, carbon fiber reinforced plastic crash stop (50) integrally formed with said distal end of one of said coil support arms;

said U-shaped crash stop forming a shock absorbing member for engagement with a stop surface that is disposed within said disk drive; and said U-shaped crash stop having a latching surface (54) for engagement with a hub latching member that is disposed within said disk drive.

* * * * *

UNITED STATES PATENT AND TRADEMARK OFFICE
CERTIFICATE OF CORRECTION

PATENT NO.   : 5,659,449
DATED        : August 19, 1997
INVENTOR(S)  : William Woodrow Brooks, Jr. et al It is certified that error appears in the above-identified patent and that said Letters Patent is hereby corrected as shown below:

Claim 1, Column 5, Line 47: "an outer arcuate" should be --an arcuate outer--

Claim 1, Column 6, Line 33: "parallel said" should be --parallel to said--.

Signed and Sealed this

Ninth Day of December, 1997

Attest:

BRUCE LEHMAN

*Attesting Officer*     *Commissioner of Patents and Trademarks*